(12) United States Patent
Fourney

(10) Patent No.: US 7,743,905 B2
(45) Date of Patent: Jun. 29, 2010

(54) TRANSVERSE-ROLLER-BELT CONVEYOR AND METHODS FOR CASE TURNING

(75) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 38 days.

(21) Appl. No.: 12/261,758

(22) Filed: Oct. 30, 2008

(65) Prior Publication Data
US 2010/0108468 A1   May 6, 2010

(51) Int. Cl.
 B65G 47/24 (2006.01)
(52) U.S. Cl. ............... 198/413; 198/415; 198/779
(58) Field of Classification Search ........... 198/413, 198/415, 779
See application file for complete search history.

(56) References Cited

U.S. PATENT DOCUMENTS

| | | | |
|---|---|---|---|
| 4,676,361 A * | 6/1987 | Heisler | 198/394 |
| 5,145,049 A * | 9/1992 | McClurkin | 198/415 |
| 6,044,956 A | 4/2000 | Henson et al. | |
| 6,073,747 A | 6/2000 | Takino et al. | |
| 6,318,544 B1 | 11/2001 | O'Connor et al. | |
| 6,571,937 B1 | 6/2003 | Costanzo et al. | |
| 7,007,792 B1 | 3/2006 | Burch | |
| 7,040,478 B2 | 5/2006 | Ehlert | |
| 7,191,894 B2 | 3/2007 | Costanzo et al. | |
| 7,311,192 B2 | 12/2007 | Fourney | |
| 7,344,018 B2 | 3/2008 | Costanzo et al. | |
| 7,360,641 B1 | 4/2008 | Fourney | |
| 7,461,739 B2 | 12/2008 | Fourney | |
| 7,533,766 B1 | 5/2009 | Fourney | |
| 2006/0032727 A1 * | 2/2006 | Burch | 198/416 |
| 2007/0205083 A1 * | 9/2007 | Smalley et al. | 198/412 |
| 2008/0169171 A1 | 7/2008 | Itoh et al. | |
| 2008/0217138 A1 | 9/2008 | Fourney | |
| 2009/0173598 A1 | 7/2009 | Fourney | |
| 2009/0200139 A1 | 8/2009 | Kissee et al. | |
| 2009/0250321 A1 | 10/2009 | Krisl | |

FOREIGN PATENT DOCUMENTS

| | | |
|---|---|---|
| JP | 03-088617 A | 5/1991 |
| WO | 2008/124626 A2 | 10/2008 |
| WO | 2009/029091 A1 | 3/2009 |

OTHER PUBLICATIONS

PCT/US09/61999, Search Report and Written Opinion of the ISA/EP, Mar. 11, 2010, European Patent Office, Rijswijk, NL.

* cited by examiner

*Primary Examiner*—James R Bidwell
(74) *Attorney, Agent, or Firm*—James T. Cronvich

(57) ABSTRACT

A conveyor and methods for turning cases. The conveyor includes a pair of side-by-side belts running preferably at different speeds. The different belt speeds cause the leading edge of a package straddling both belts to move toward the slower belt. The two belts include transverse rollers that can be selectively actuated in a series of actuation zones along the conveyor to push packages conveyed atop them to the right or to the left. A controller controls the actuation of the belt rollers in each zone sequentially so that the belt rollers supporting the leading edge of the package push it towards the slower belt and the belt rollers supporting the trailing edge of the package push it towards the faster belt to accelerate the turning of the package as the belts advance.

14 Claims, 8 Drawing Sheets

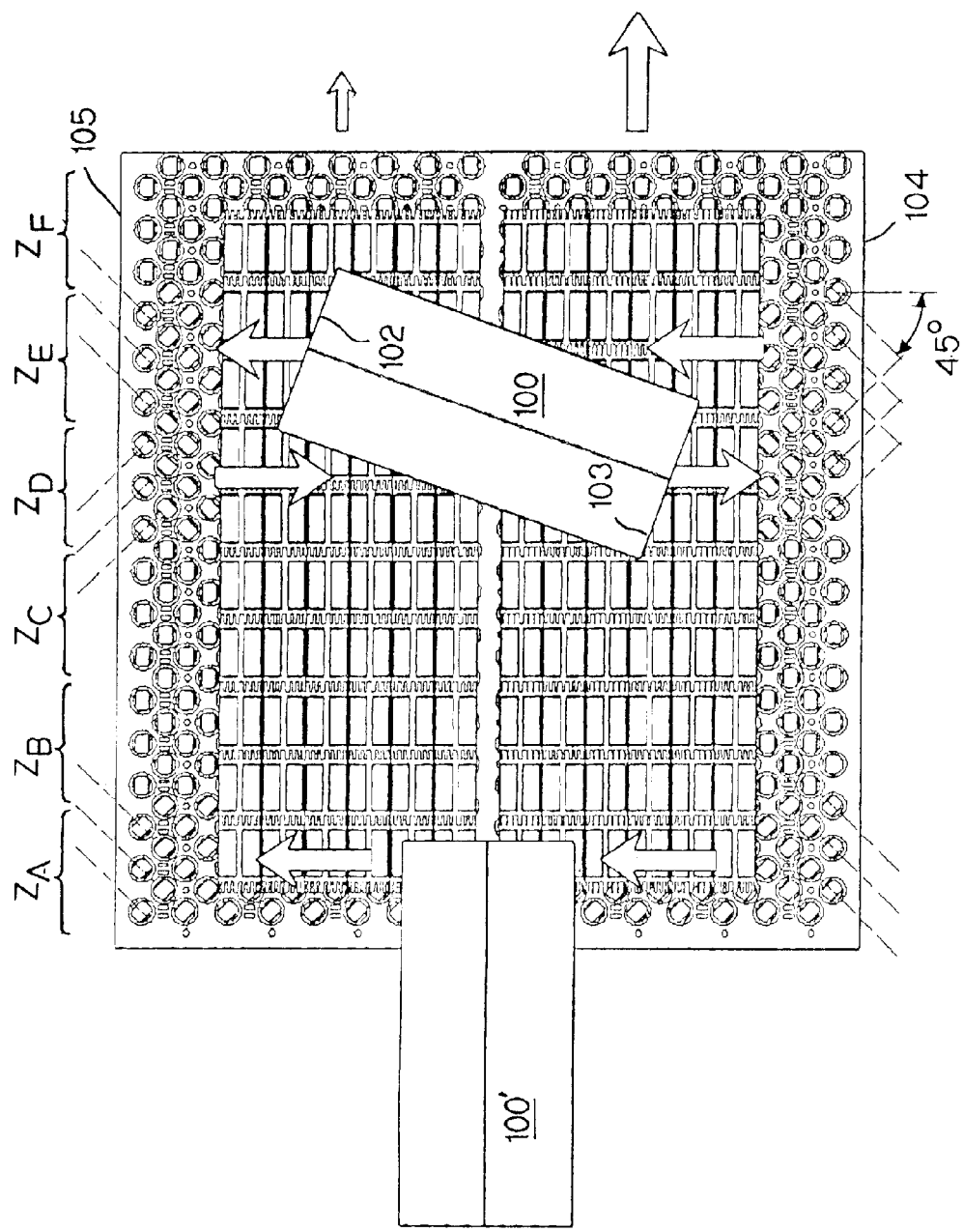

TRANSVERSE-ROLLER-BELT CONVEYOR AND METHODS FOR CASE TURNING

BACKGROUND

The invention relates generally to power-driven conveyors and, more particularly, to belt conveyors and methods for turning cases using conveyor belts with selectively actuated, case-supporting rollers.

Traditional case-turning conveyors use two side-by-side conveyor belts traveling parallel to each other at different speeds. When a package is fed onto and straddles the two belts, the faster belt pulls one side of the package ahead, causing the package to rotate, its leading edge moving toward the slower belt. The package continues to rotate as it is conveyed along the conveyor, finally resting mostly on the slower belt and turned somewhat less than 90°. The package is then plowed into its final orientation and lateral location by a rail extending across the conveyor.

Thus, there is a need for a case turner that can turn packages completely 90° in a short distance without the need for plowing.

SUMMARY

This need and other needs are addressed by a conveyor embodying features of the invention. One version of such a conveyor comprises a first conveyor belt advancing at a first speed in a direction of belt travel. A second conveyor belt is arranged side-by-side with the first conveyor belt. The second conveyor belt advances in the direction of belt travel at a second speed. Preferably, the first speed is greater than the second speed. The first and second conveyor belts have article-supporting rollers arranged to rotate perpendicular to the direction of belt travel. A series of sequentially actuated actuation zones are disposed consecutively along the length of the conveyor. Each actuation zone has actuators selectively actuating all the article-supporting rollers of the first and second conveyor belts in the actuation zone to rotate in one perpendicular direction or in the opposite direction.

In another aspect of the invention, a method for turning an article comprises: advancing a first conveyor belt at a first speed in a direction of belt travel; advancing a parallel second conveyor belt at a second speed in the direction of belt travel; sensing the leading edge of a conveyed article straddling the first and second conveyor belts; actuating article-supporting rollers in the first and second conveyor belts supporting the leading edge of the conveyed article to rotate in a direction perpendicular to the direction of belt travel to move the leading edge of the conveyed article toward the second conveyor belt; and actuating article-supporting rollers in the first and second conveyor belts supporting the trailing edge of the article to rotate in a direction opposite to the direction of the rollers supporting the leading edge to move the trailing edge of the article toward the first conveyor belt.

Yet another aspect of the invention provides a method for turning an article. The method comprises: conveying an article simultaneously on a pair of side-by-side conveyor belts advancing at different speeds in a direction of belt travel to cause the article to rotate with the leading edge of the article moving toward the slower belt and the trailing edge of the article moving toward the faster belt; and accelerating the rotation of the article by actuating article-supporting rollers in both conveyor belts under the leading edge to rotate toward the slower belt and by actuating article-supporting rollers in both conveyor belts under the trailing edge of the article to rotate toward the faster belt.

BRIEF DESCRIPTION OF THE DRAWINGS

These features and aspects of the invention are exemplified in more detail in the following description, appended claims, and accompanying drawings, in which:

FIGS. 7A-7C are top plan views of the case-turning conveyor of FIG. 1 illustrating its operation.

DETAILED DESCRIPTION

Figure 1:
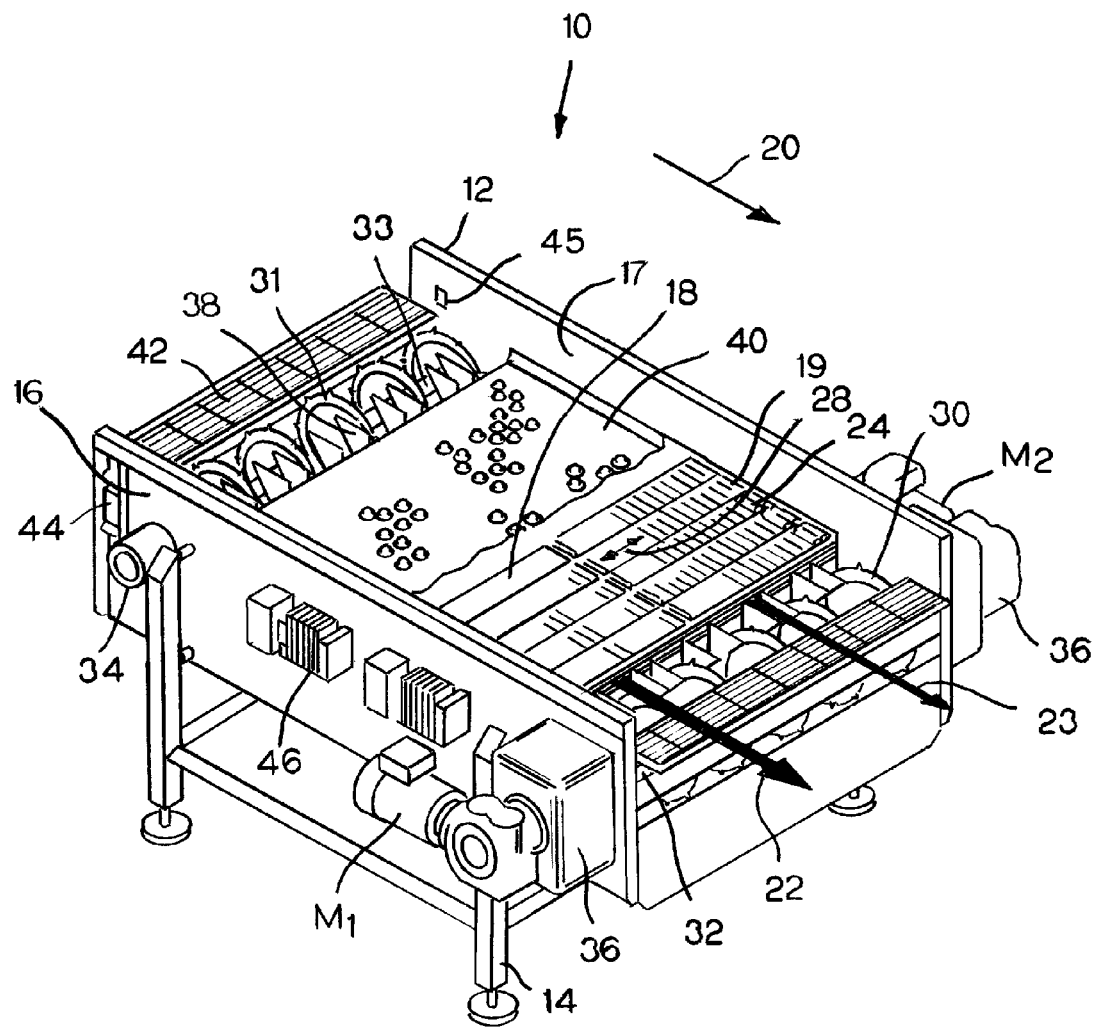
FIG. 1 is an isometric view, partly cut away, of a case-turning conveyor embodying features of the invention.

One version of a case-turning conveyor embodying features of the invention is shown in FIG. 1. The conveyor 10 includes a conveyor frame 12 mounted on legs 14. The frame includes a pair of side walls 16, 17 that confine conveyed articles, such as packages, and serve as mounts for various conveyor components. Articles are conveyed along the conveyor by a pair of side-by-side conveyor belts 18, 19, both advancing in a direction of belt travel 20. In general, one of the belts travels at a high speed 22 and the other at a low speed 23. But both belts could travel at the same speed. Both belts have rows of article-supporting rollers 24 mounted on axles 26 (FIG. 2) parallel to the direction of belt travel. This allows the rollers to rotate perpendicular to the direction of belt travel as indicated by two-headed arrow 28.

The endless belts are trained around drive and idle sprockets 30, 31, which engage the belts at opposite ends of the conveyor to drive them in the direction of belt travel. The sprockets are mounted on a pair of drive shafts 32 and idle shafts 33. The sprockets for one of the drive shafts and one of the idle shafts engage one of the conveyor belts; the sprockets for the other drive shaft and idle shaft engage the other belt. The idle shafts 33 are supported at outside ends in shaft bearings 34 mounted to the side walls of the conveyor. Shaft bearings (not shown) for the inside ends of the idle and drive shafts are mounted to the conveyor frame under the abutting portions of the two belts. The outside ends of the drive shafts are coupled to motors $M_1$, $M_2$ through gearboxes 36. The motors drive the drive shafts to advance the belts in the direction of belt travel.

The belts are supported just inward of the sprockets on narrow rails 38 that contact the inner sides of the belt between consecutive rollers. The belts are supported on a roller-actuating mechanism 40 along a major portion of the length of the conveyor. Articles entering and exiting the conveyor ride across roller transfer plates 42. A sensor, such as a photo eye including a photo emitter 44, is mounted to one of the side walls at the entrance to the conveyor. A reflector 45 on the side wall opposite the photo eye reflects emitted light back to the photo eye unless the light beam is occluded by an article entering the conveyor. But any sensor capable of detecting the presence of an article entering the conveyor could be used instead of a photo eye. Also mounted to the conveyor frame are input/output devices 46, such as relay units, forming an interface between the conveyor and a programmable logic controller (PLC).

Figure 2:
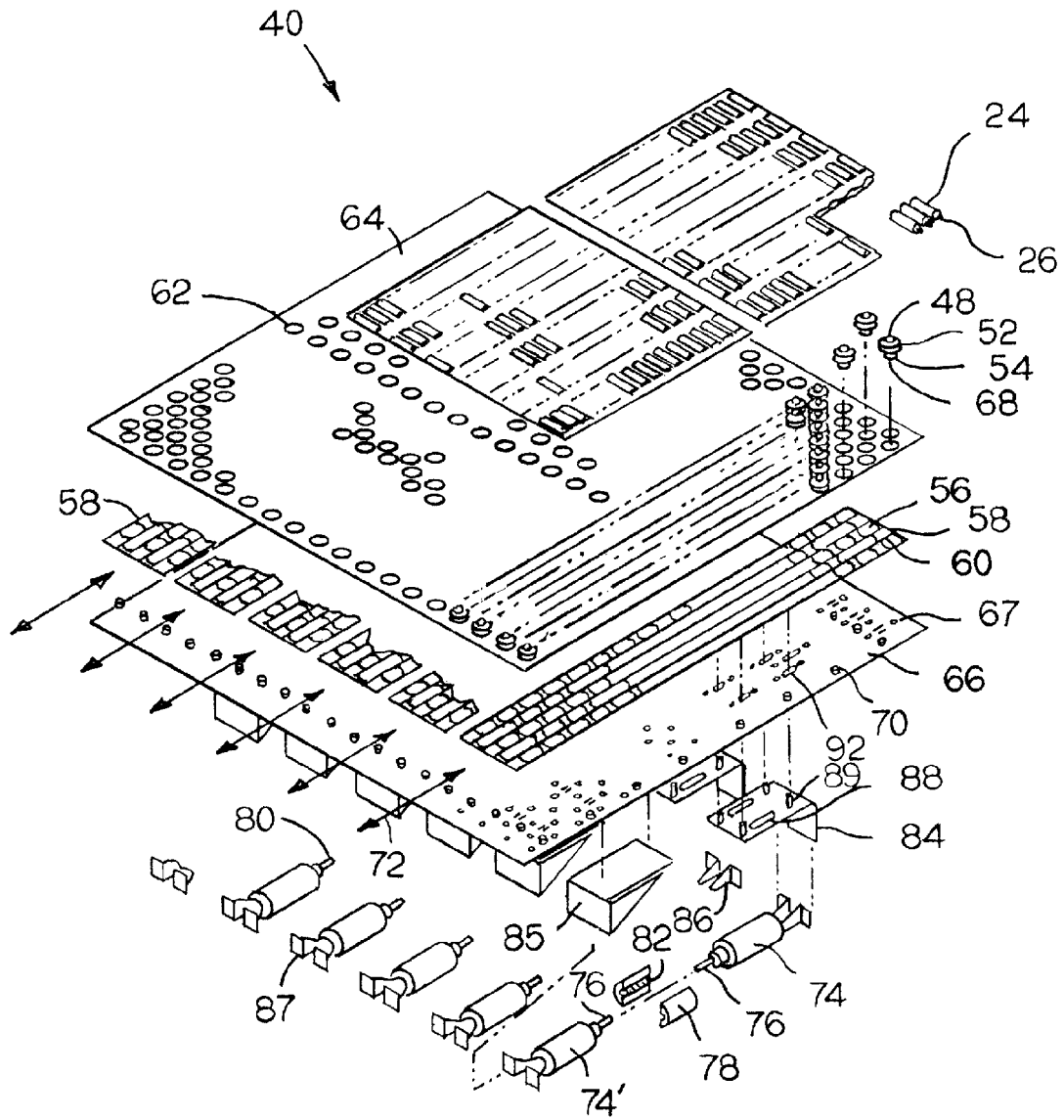
FIG. 2 is an exploded isometric view of the roller-actuation system of the conveyor of FIG. 1.
Figure 3:
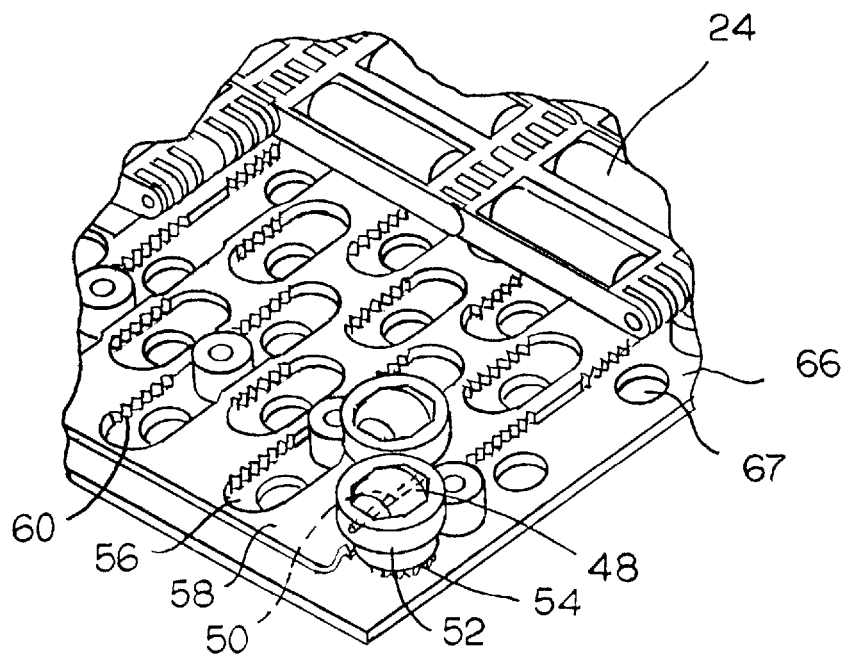
FIG. 3 is an enlarged isometric view of a portion of the roller-actuation system of FIG. 2 showing rack-and-pinion roller actuation.
Figure 4:
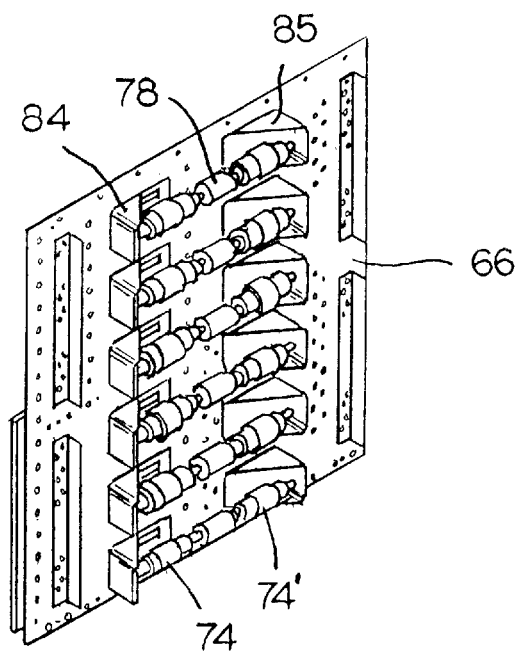
FIG. 4 is a bottom isometric view of the rack actuators in the roller-actuation system of FIG. 2.

The roller-actuating mechanism 40, as shown in FIGS. 2-4, comprises an array of small actuating rollers 48 mounted on axles 50 supported in geared rotary carriers 52. A pinion gear 54 at the bottom of each rotary carrier rides along a slot 56 in an actuator plate 58. Teeth 60 formed on one side of the slot mesh with the teeth of the pinion gear to rotate the rotary carrier and change the direction of rotation of the actuating roller as the actuator plate translates laterally in the width direction of the conveyor. The slot teeth form a rack gear for each rotary carrier.

The rotary carriers extend through circular openings 62 in a carryway pan 64 affixed to the conveyor frame. The carryway pan fixes the position of the actuating rollers in the array and allows each rotary carrier to rotate in its opening. The pan is attached to a lower bottom plate 66, also affixed to the conveyor frame. Small openings 67 in the bottom plate for each roller rotatably receive lower stems 68 at the bottom of each rotary carrier to provide stability. The pan and the bottom plate are fastened together and spaced apart by spacers 70. A series of actuator plates 58 are sandwiched between the pan and the bottom plate. The actuator plates, which extend across the width of the conveyor, are free to translate laterally, as indicated by arrow 72, to rotate the rotary carriers.

The actuator plates, or gear racks 58, are pulled left or right or centered by actuators, such as linear actuators or pneumatic cylinders 74, 74'. Each pair of opposed cylinders, whose rods 76 are joined by an adjustable coupling 78, is arranged to translate one of the gear racks. Threaded ends 80 of the piston rods 76 are received in a threaded bore 82 in the adjustable coupling. The coupling allows the cylinder rods to be adjusted to provide the correct amount of gear-rack translation. The closed ends of the cylinders are attached to cylinder mounts 84, 85 by devises 86, 87. One of the cylinder mounts 85 is stationarily affixed to the lower side of the bottom plate. The other mount 84 has a pair of slots 88 that allow it to slide along the lower side of the bottom plate. Pins 89 extending from the slotted mount 84 through a slot 92 in the bottom plate connect to the corresponding gear rack 58. In this way, the gear rack translates with the slotted cylinder mount.

Figure 5A:
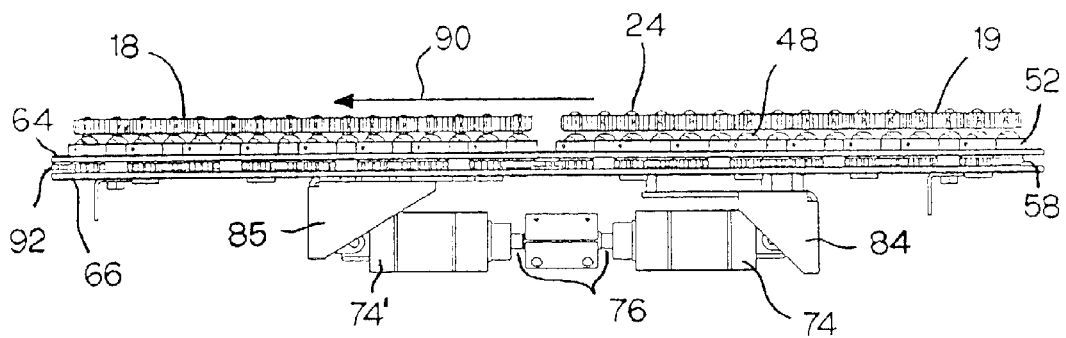
FIGS. 5A-5C are cross sectional views looking upstream at the conveyor of FIG. 1 showing actuating rollers in positions causing the belt rollers to rotate in directions to push conveyed packages to the left in FIG. 5A, to the right in FIG. 5B, and to brake the belt rollers in FIG. 5C.
Figure 5B:
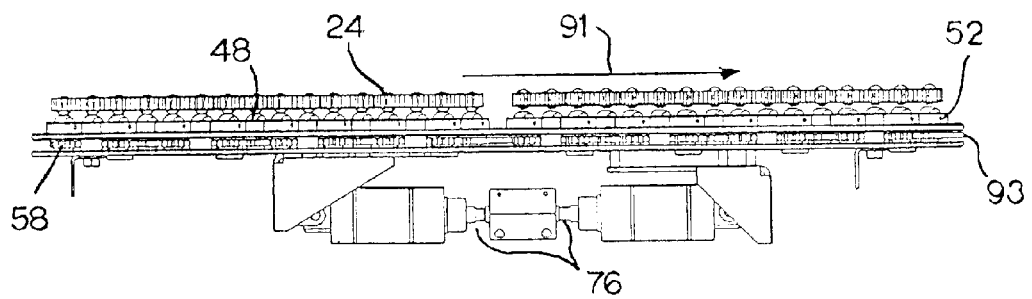
Figure 5C:
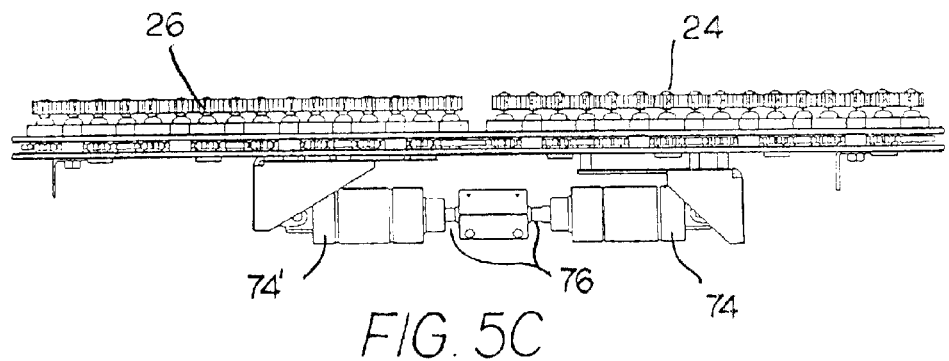

The operation of one gear rack 58 of the roller-actuating mechanism 40 is illustrated in FIGS. 5A-5C, which show a cross section of the conveyor looking upstream opposite to the direction of belt travel for three conditions. In FIG. 5A, the belt rollers 24 are actuated to push conveyed articles to the left, as indicated by arrow 90. The belt rollers protrude through the thickness of the belt 18, 19 into contact with the peripheries of the actuating rollers 48, whose rotary carriers 52 are shown rotated to their maximum counterclockwise position. In this orientation, the tops of the belt rollers rolling on the obliquely oriented actuating rollers rotate toward the left as the belts advance in the direction of belt travel. The rotary carriers are rotated into this position by the gear rack 58, which is shifted to the left in FIG. 5A by the pneumatic cylinders 74, 74'. In this condition, both cylinders are in their fully refracted positions, as indicated by the short extension of both piston rods 76, which pulls the gear rack 58 all the way to the left edge 92 of the sandwich formed by the pan 64 and the bottom plate 66.

In FIG. 5B, the cylinders are shown with their rods 76 both fully extended, pushing the gear rack 58 to is rightmost position at the right side 93 of the sandwich. This causes the gear rack to rotate the rotary carriers fully clockwise to change their orientation and the axes of rotation of the actuating rollers 48 into an oblique orientation facing the other side of the conveyor. Now, as the belts advance in the direction of belt travel, articles supported atop the belt rollers 24 are pushed toward the right, as indicated by arrow 91, as the belts advance in the direction of belt travel.

The article-supporting belt rollers 24 may be braked as shown in FIG. 5C. In this condition, the piston rods 76 of one of the pneumatic cylinders 74' is retracted while the rod of the other cylinder 74 is extended. This centers the gear rack 58 in the sandwich and aligns the axles of the actuating rollers perpendicular, and not oblique, to the direction of belt travel into the axles 26 of the belt rollers. This allows the belt rollers to ride along the orthogonally positioned actuating rollers without rotation.

Figure 6:
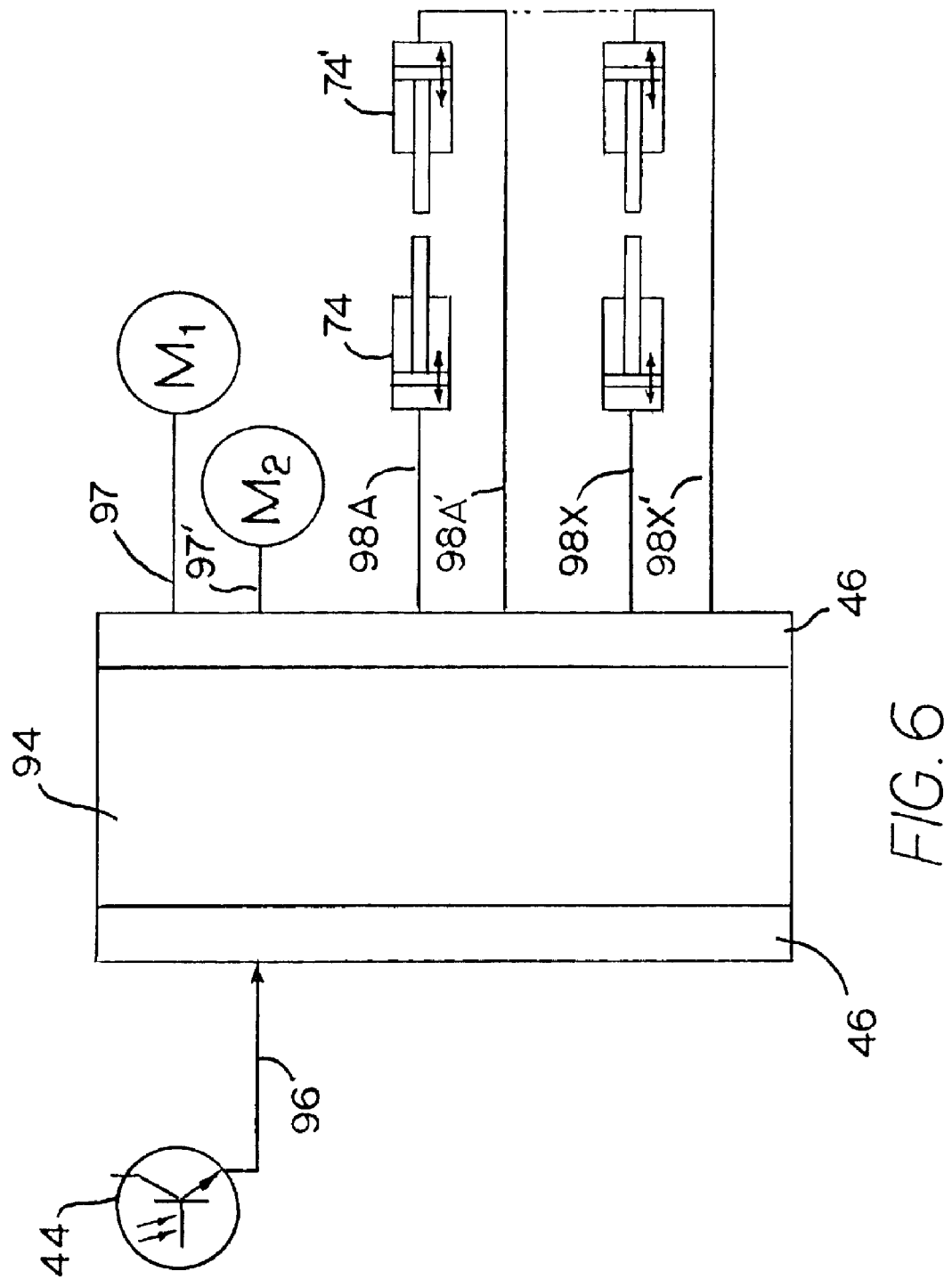
FIG. 6 is a schematic diagram of the roller-actuation control system used in the conveyor of FIG. 1.

As shown schematically in FIG. 6, the conveyor is controlled by a controller 94 such as a PLC. Other controllers, such as PC's or special-purpose processors, may be used instead. Input/output devices 46 local or remote to the PLC route sensor input to and control signals from the PLC. For example, the photo eye 44 changes state whenever the light beam crossing the entrance of the conveyor is blocked by the presence of a conveyed article. The photo eye signal 96 is used to indicate that an article is entering the conveyor. The PLC can also control the speeds of the two conveyor belts by changing the speeds of their motors $M_1$, $M_2$ by signals on motor control lines 97, 97'. And each of the pairs of pneumatic cylinders 74, 74' associated with each gear rack can be controlled by signals on signal lines 98A, 98A'-98X, 98X' from the PLC via the input/output devices 46, such as relay units.

Figure 7A:
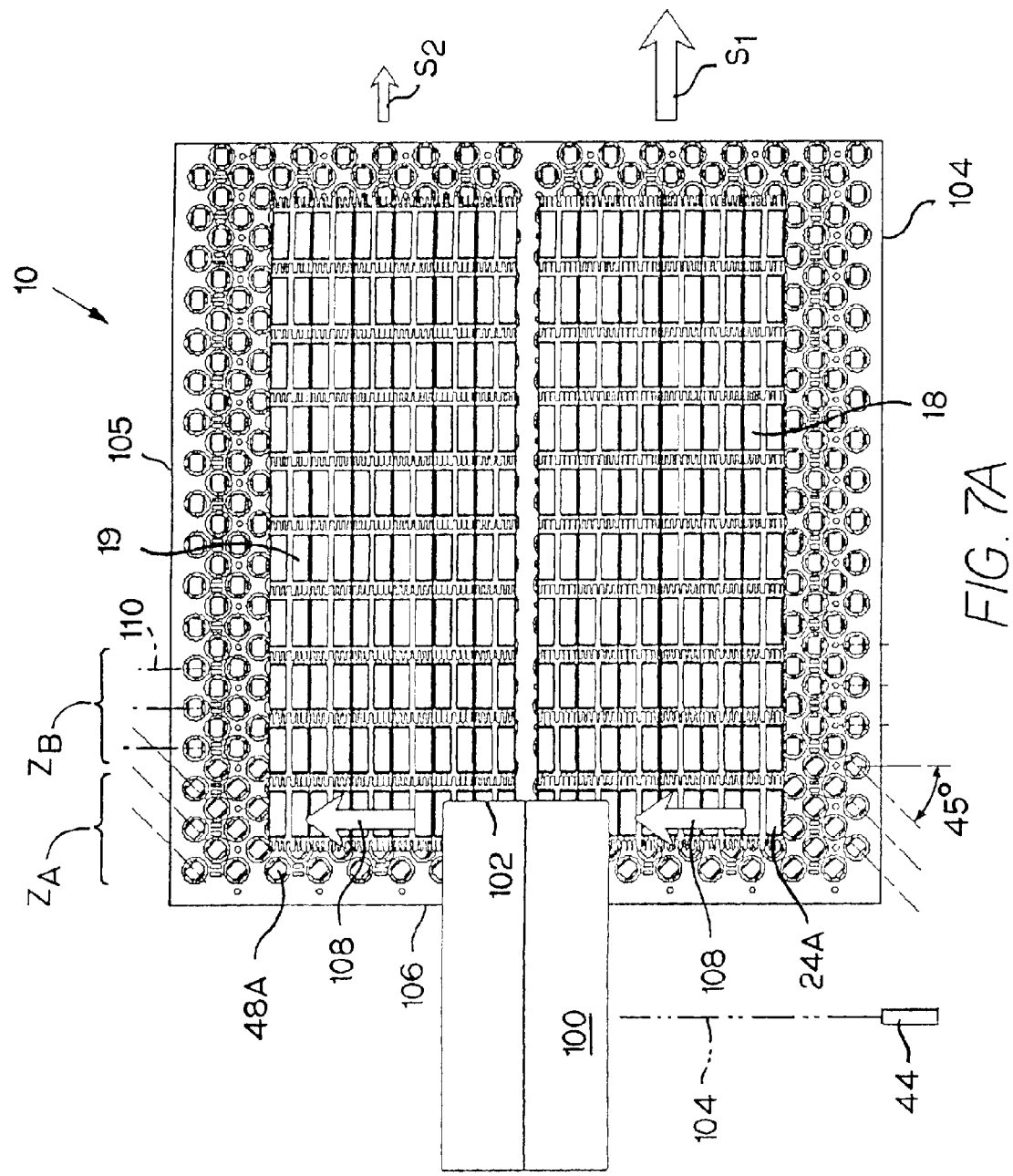
Figure 7B:
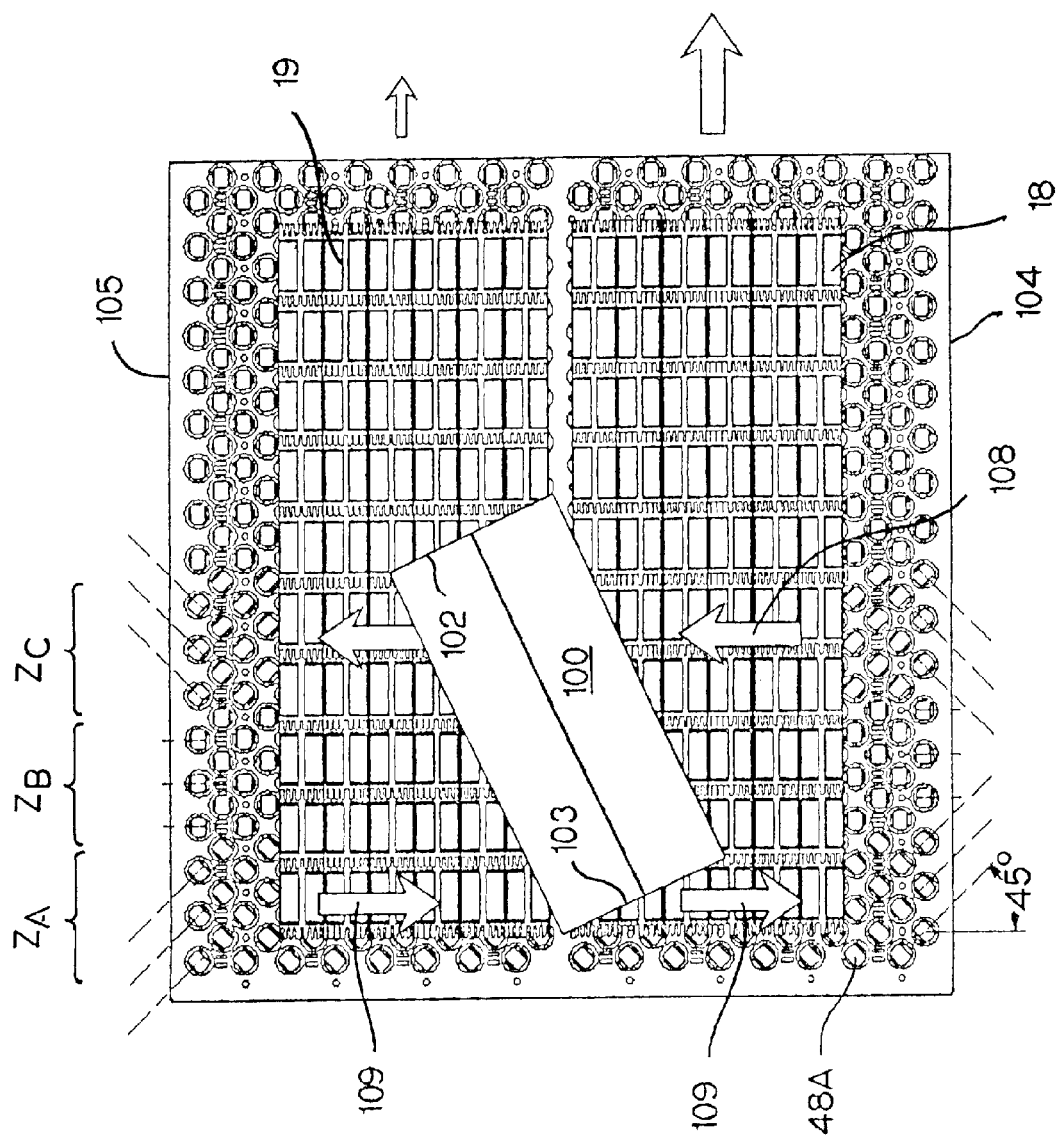

The process of turning a case 90° according to the invention is illustrated in FIGS. 7A-7C. In FIG. 7A, an article in the form of a rectangular package 100 enters the case-turning conveyor 10 straddling both belts 18, 19 and with its short edge 102 leading (easy way). The right-hand belt advances at a first speed $s_1$ greater than the speed $s_2$ of the left-hand belt 19. As soon as the leading edge of the package interrupted the light beam 104 at the entrance to the conveyor, the photo eye sensor 44 signaled the PLC. Upon receiving the package-entry signal, the PLC actuated the upstream-most gear rack to rotate its associated rotary carriers 50A and their actuating rollers 48A through a 45° angle toward the right side 104 (looking downstream) of the conveyor. The actuating rollers controlled by the upstream-most gear rack form a first actuation zone $Z_A$ that extends across the width of the conveyor just downstream of its upstream end 106. The belt rollers 24A, which roll on the obliquely oriented actuating rollers 48A in zone $Z_A$ and support the leading edge of the package, rotate toward the left side 105 of the conveyor, as indicated by arrows 108, as the belts advance. The leading edge, which is urged toward the slower belt 19 by the speed differential of the two belts, is further pushed in that direction by the rotation of the article-supporting rollers in zone $Z_A$. All the actuating rollers downstream of zone $Z_A$, such as those in zone $Z_B$, are oriented with their axes 110 perpendicular to the direction of belt travel. As the leading edge 102 of the package advances along the length of the conveyor, the PLC times the actuation and direction of the actuating rollers and subsequent actuation zones so that the leading edge is always subjected to a leftward lateral force by its supporting belt rollers. So, depending on the speed of the motors and with knowledge of the turning characteristics of the package, the PLC can sequentially actuate successive zones to continue to push the leading edge of the package toward the left. And, as the leading edge clears a zone, the PLC can quickly deactuate that zone to prevent the belt rollers from urging the middle of the package toward one side or the other.

FIG. 7B shows the trailing edge 103 just entering zone $Z_A$. The rollers in $Z_C$ under the leading edge 102 of the package are actuated to continue the push of the leading edge toward the slower belt 19 on the left. The rollers just behind, in zone $Z_B$, supporting the middle of the package are deactuated in their brake position and exert no lateral force on the package. The rollers in zone $Z_A$ are actuated by the PLC to push the trailing edge of the package toward the faster belt 18 on the right side 104 of the conveyor. Consequently, in zone $Z_A$, the actuating rollers 48A are oriented obliquely at 45° toward the left side 105 of the conveyor to cause the belt rollers to push the trailing edge of the package in the direction of arrows 109. By actuating the belt rollers under the leading edge of the package to rotate toward the slower belt and actuating the rollers under the trailing edge to rotate toward the faster belt, the PLC can accelerate the turning of the package in a shorter distance along the length of the conveyor.

As shown in FIG. 7C, in which the package 100 is almost turned fully 90° with its long side leading (hard way), the leading short edge 102 is in actuation zone $Z_E$ and the trailing short edge is in zone $Z_D$. In this situation, the belt rollers in zone $Z_E$ are actuated to push the leading short edge toward the left side 105 of the conveyor and the belt rollers in zone $Z_D$ are actuated to push the trailing short edge toward the right side 104. And the rollers in zone $Z_F$ ahead of the package and in zones $Z_C$ and $Z_B$ now behind the package are deactuated, awaiting the arrival of the leading edge of a subsequent package 100', just entering newly actuated zone $Z_A$ to undergo the same case-turning process.

The total length along the conveyor of the actuation zones, the shape, weight, and frictional characteristics of the packages, the maximum speeds of the belts, and the desired degree of package turning are all important factors in determining at what speeds to run the belts and how much conveyor length is required to turn the packages as desired before feeding them off the downstream end of the conveyor. To prevent packages from turning past the desired goal, the PLC could start advancing the belts at the same speed once a leading package reached one of the downstream zones at which it should have been fully rotated and until that package reached the exit end of the conveyor. Then, the PLC could return the two belts to their normal differential speeds to turn the trailing package. Of course, it would be possible to select just the right length of conveyor or the number of zones to actuate to turn packages of various characteristics.

Although the invention has been described in detail with respect to a preferred version, other versions are possible. For example, multiple sensors could be spaced along the length of the conveyor, such as one per actuation zone, to give the PLC a realtime indication of a package's position to control the actuation zones, rather than having the PLC rely on a timing sequence triggered by just a single package sensor at the entrance of the conveyor. Likewise, the PLC could control the absolute, as well as the relative speeds of the two belts. So, as these few examples suggest, the scope of the claims is not meant to be limited to the preferred version described in detail.

What is claimed is:

1. A conveyor comprising:
   a first conveyor belt advancing at a first speed in a direction of belt travel and having article-supporting rollers arranged to rotate perpendicular to the direction of belt travel;
   a second conveyor belt arranged side-by-side with the first conveyor belt and advancing in the direction of belt travel at a second speed and having article-supporting rollers arranged to rotate perpendicular to the direction of belt travel;
   a series of sequentially actuated actuation zones disposed consecutively along the length of the conveyor, each actuation zone having actuators actuating all the article-supporting rollers of the first and second conveyor belts in each actuation zone to rotate in one perpendicular direction or in the opposite direction.

2. A conveyor as in claim 1 wherein, when the leading edge of a conveyed article is in an actuation zone, the actuators for that actuation zone actuate the article-supporting rollers in that actuation zone to rotate in a perpendicular direction pushing the leading edge of the conveyed article toward the second conveyor belt.

3. A conveyor as in claim 2 wherein, when the trailing edge of a conveyed article is in an actuation zone, the actuators for that actuation zone actuate the article-supporting rollers in that actuation zone to rotate in a perpendicular direction pushing the trailing edge of the conveyed article toward the first conveyor belt.

4. A conveyor as in claim 3 wherein the actuators for an actuation zone between the leading edge and the trailing edge of a conveyed article deactuate the article-supporting rollers in that actuation zone to disable rotation in a perpendicular direction.

5. A conveyor as in claim 1 wherein the first speed is greater than the second speed.

6. A conveyor as in claim 1 further comprising a sensor sensing the leading edge of a conveyed article entering a first actuation zone and sending a signal to actuate the article-supporting rollers in the first actuation zone to push the leading edge of the article toward the second conveyor.

7. A conveyor as in claim 1 wherein each actuation zone comprises an array of actuating rollers underlying the first and second conveyor belts and contacting the article-conveying rollers along a portion of the length of the conveyor and means for changing the angle of rotation of the actuating rollers to change the direction of rotation of the article-supporting rollers.

8. A conveyor as in claim 7 wherein the actuating rollers include pinion gears and the means for changing the angle of rotation of the actuating rollers comprises an assembly of rack gears engaging the pinion gears of corresponding rack gears to rotate the angle of rotation of the actuating rollers.

9. A conveyor as in claim 1 further comprising a controller that controls the timing of the sequential actuation of the actuation zones and the direction of rotation of the article-supporting rollers in the actuation zones.

10. A method for turning an article, comprising:
   advancing a first conveyor belt at a first speed in a direction of belt travel;
   advancing a parallel second conveyor belt at a second speed in the direction of belt travel;
   sensing the leading edge of a conveyed article straddling the first and second conveyor belts;
   actuating article-supporting rollers in the first and second conveyor belts supporting the leading edge of the conveyed article to rotate in a direction perpendicular to the direction of belt travel to move the leading edge of the conveyed article toward the second conveyor belt;
   actuating article-supporting rollers in the first and second conveyor belts supporting the trailing edge of the article to rotate in a direction opposite to the direction of the rollers supporting the leading edge to move the trailing edge of the article toward the first conveyor belt.

11. The method of claim 10 further comprising:
deactuating article-supporting rollers in the first and second conveyor belts between the leading and trailing edges of the conveyed article.

12. The method of claim 10 further comprising turning the article 90°.

13. The method of claim 10 wherein the first speed is greater than the second speed.

14. A method for turning an article, comprising:
conveying an article simultaneously on a pair of side-by-side conveyor belts advancing at different speeds in a direction of belt travel to cause the article to rotate with the leading edge of the article moving toward the slower belt and the trailing edge of the article moving toward the faster belt;
accelerating the rotation of the article by actuating article-supporting rollers in both conveyor belts under the leading edge to rotate toward the slower belt and by actuating article-supporting rollers in both conveyor belts under the trailing edge of the article to rotate toward the faster belt.

* * * * *